(12) United States Patent
Schmidt

(10) Patent No.: US 7,895,363 B2
(45) Date of Patent: Feb. 22, 2011

(54) ALLOCATING MEMORY IN A BROKER SYSTEM

(75) Inventor: Wolfgang Schmidt, Zwingenberg (DE)

(73) Assignee: Software AG, Darmstadt (DE)

( * ) Notice: Subject to any disclaimer, the term of this patent is extended or adjusted under 35 U.S.C. 154(b) by 317 days.

(21) Appl. No.: 11/970,594

(22) Filed: Jan. 8, 2008

(65) Prior Publication Data
US 2009/0172336 A1 Jul. 2, 2009

(30) Foreign Application Priority Data
Dec. 28, 2007 (EP) ................... 07025220

(51) Int. Cl.
*G06F 15/16* (2006.01)
(52) U.S. Cl. ..................... 709/250; 707/711
(58) Field of Classification Search ................. 709/250; 707/711
See application file for complete search history.

(56) References Cited

U.S. PATENT DOCUMENTS

| 6,065,019 | A | 5/2000 | Ault et al. |
| 6,539,464 | B1 | 3/2003 | Getov |
| 2004/0015977 | A1* | 1/2004 | Benke et al. ................. 718/105 |
| 2005/0114621 | A1* | 5/2005 | Lahiri et al. ................. 711/170 |
| 2007/0271419 | A1* | 11/2007 | Yasukaga et al. ............ 711/147 |
| 2008/0126547 | A1* | 5/2008 | Waldspurger ............... 709/226 |

FOREIGN PATENT DOCUMENTS

EP 0405724 1/1991

OTHER PUBLICATIONS

European search report for application No. EP 07025220, mailed May 8, 2008, 9 pages.

* cited by examiner

*Primary Examiner*—John Follansbee
*Assistant Examiner*—Glenford Madamba
(74) *Attorney, Agent, or Firm*—Meyertons Hood Kivlin Kowert & Goetzel, P.C.; Jeffrey C. Hood; Joel L. Stevens

(57) ABSTRACT

Memory allocation in a Broker system for managing the communication between a plurality of clients and a plurality of servers. The method may include allocating memory for a plurality of memory pools; and dividing each memory pool into memory blocks of a size which is specific to the type of a resource. The resource may be related to the communication managed by the Broker.

15 Claims, 3 Drawing Sheets

ALLOCATING MEMORY IN A BROKER SYSTEM

PRIORITY CLAIM

Figure 1:
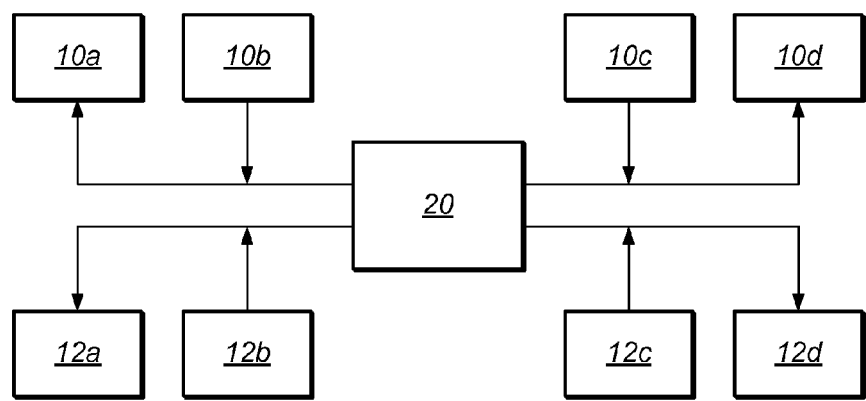

This application claims benefit of priority of European application no. 07 025 220.0 titled "Method and System for Allocating Memory in a Broker System", filed Dec. 28, 2007 and whose inventor is Wolfgang Schmidt.

INCORPORATED BY REFERENCE

European application no. 07 025 220.0 titled "Method and System for Allocating Memory in a Broker System", filed Dec. 28, 2007 and whose inventor is Wolfgang Schmidt, is hereby incorporated by reference in its entirety as though fully and completely set forth herein.

TECHNICAL FIELD

The present invention relates to a method and a system for allocating memory in a Broker system.

DESCRIPTION OF THE RELATED ART

Nowadays client-server-networks are omnipresent in computing environments. A client is to be understood as any kind of participant of such a network requesting a service provided in the network. A server is any participant of such a network providing services for clients in the network. For example, a client can be any kind of application program requesting data from a server representing a database.

Managing the communication between a plurality of clients and a plurality of servers is particularly difficult if the participants of such a network are heterogeneous, i.e., reside on different hardware platforms and operating systems and/or apply different software. Further, clients as well as servers may use different network protocols and/or may be involved in different network architectures.

It is known from the prior art to manage the communication between client(s) and server(s) using a service Broker, e.g. a Broker as, for example, disclosed in EP 0 600 235 B1 of the applicant. The above described functionality of the Broker includes holding necessary information on the communication between clients and servers of a network in the memory of the Broker.

Prior Brokers may use a static memory model where a maximum value for the required memory is determined and then allocated during the Broker initialisation based on a known configuration. However, it is difficult to determine a reasonable maximum value, which provides enough memory and at the same time does not leave too much memory unused. Further, after the initialization no changes to the specific memory organisation are possible, so that during the whole operation of the Broker the memory consumption cannot be adapted. Any request for memory requiring more memory for a resource than is available cannot be satisfied. In these systems, changing memory requirements regarding the number of specific resources can only be adapted after reconfiguration and restart of the Broker.

It is further known in the prior art that the operating system itself completely manages the memory and all requests for memory are directly given to the operating system. Alternatively, dynamic heap management as an extension to the functionality of the operating system can be used. The memory managed by this heap management can be extended, in case of an increase in the amount of the required memory. On request, for example from an application program, the heap management may provide the required memory space wherein the memory space is always contiguous. If the memory is no longer needed, it can be freed. Since each resource has its own requirements concerning memory size and since the memory is requested as needed, the next free and suitably-sized memory block is provided by the heap management or a memory block of the right size is cut from the remaining free memory available to the heap management. This leads to the well-known problem of memory fragmentation. As a result, an application may not be provided with sufficiently large amount of memory although this amount is in fact available but not in a contiguous form. Consequently, defragmentation which is difficult and time consuming becomes unavoidable.

Thus, improvements in memory management for a broker system are desired.

SUMMARY OF THE INVENTION

Various embodiments are presented of a method for managing memory in a Broker system.

In one embodiment, a memory allocation method in a Broker system manages the communication between a plurality of clients and a plurality of servers. The method may include allocating memory for a plurality of memory pools; and dividing each memory pool into memory blocks of a size, which is specific to the type of a resource. The resource may be related to the communication managed by the Broker.

In contrast to the prior art mentioned above, the memory allocation method may allocate memory for a plurality of memory pools instead of only one big memory chunk, which then is either specifically organized or dynamically managed in an unspecific way. By adapting each memory pool to the specific memory needs of a different Broker resource type as, e.g., participants, conversations, publications, services, topics, messages, communication buffers, etc., the common memory fragmentation problem can be avoided for the Broker system. Therefore, each memory pool may be divided into blocks of a size, which is required by its related resource. If memory for a certain resource type is requested, its related memory pool automatically provides a correctly-sized memory block without having to find a correctly-sized free memory block or leaving memory blocks unused due to an unsuitable size.

In one embodiment, the method may include allocating a further memory pool of the specific resource type if more memory for the resource type is required during operation of the Broker. This may ensure that the Broker system remains flexible since it is not restricted to the memory allocated during initialization but can allocate more memory at runtime. The Broker may dynamically adapt to the current requirements of the different resources without having to be restarted with an altered configuration.

In some embodiments, the memory of a memory pool can be dynamically deallocated, if the pool is not used. To this end, a timeout-manager may be introduced, which may automatically issue the deallocation of the memory of an unused pool after a predetermined amount of time. Deallocating unused memory pools may allow for reusing of freed memory for other resources, thus providing an economic usage of the available memory.

The allocation and/or deallocation of memory for a memory pool may be requested using a ticket system. The allocation and/or deallocation may be performed from a dedicated thread or task. Every thread or task of the Broker system requiring more memory for a resource may issue a corresponding order by using the ticket system whereupon the dedicated thread or task generates a new pool. The same may apply for the deallocation of memory pools, which are no longer used. As a result, the method may be portable and can operate on different underlying operating systems and/or hardware. Further, it may be applicable to systems supporting multithreading as well as to systems supporting only multitasking.

In one embodiment, the memory pool may be divided into an administrative part and a data part. Each administrative part may include information on which data blocks in the data part are free and which already store something. In other words it may reflect the load of the memory blocks in the pool and thus contributes to a pool management wherein defragmentation is unnecessary. The overall memory management for the different specific resources and the overview about free memory may be facilitated by each pool having its one administrative part.

In some embodiments, the data part of the memory pool may be divided into memory blocks of a fixed size, wherein the size and the amount of the memory blocks may be specific to the memory pool's resource type. This fixed size being adapted to suit the related resource assures that a request for a suitable memory block can always be satisfied unless the pool itself is full. All memory of the pool may be used and no unsuitably-sized, small memory blocks will remain unused, so no memory is wasted. This is a further aspect for avoiding unwanted memory fragmentation.

In one embodiment, it is possible to store data with varying requirements for memory space in the data part of a memory pool. By not restricting the data or resources which can be stored to a fixed size, the allocation method of the present invention is more flexible.

The descriptions above may also apply to program instructions stored on a computer accessible memory medium. The program instructions may be executable by a processor to perform various ones of the methods described above.

Finally, a memory allocation system in a Broker system managing the communication between a plurality of clients and a plurality of servers may implement the method described above. The system may include a plurality of memory pools, wherein each memory pool comprises memory blocks of a size, which is specific to the type of a resource, the resource being related to the communication managed by the Broker.

SHORT DESCRIPTION OF THE DRAWINGS

Figure 2:
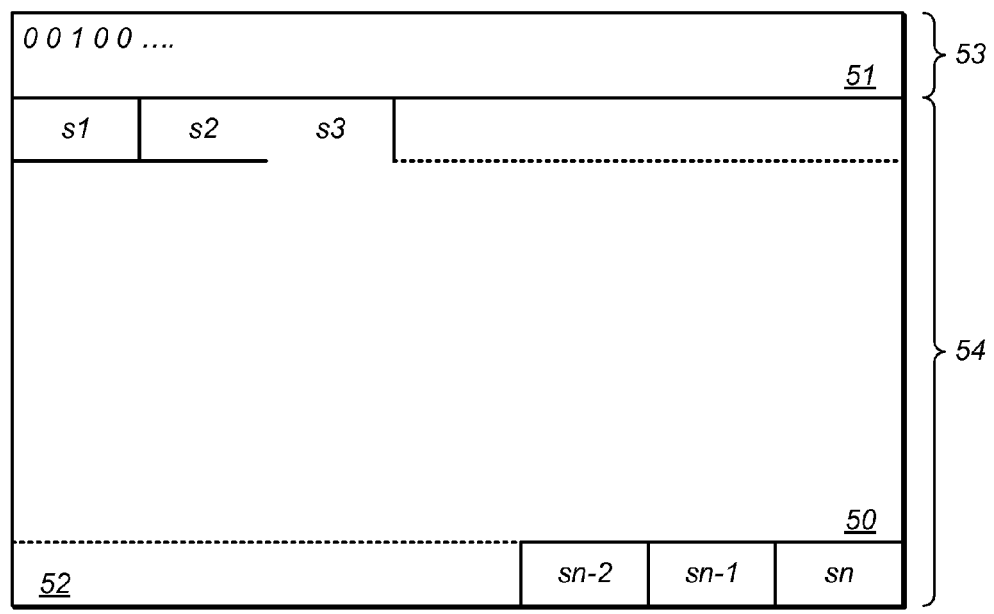
Figure 3:
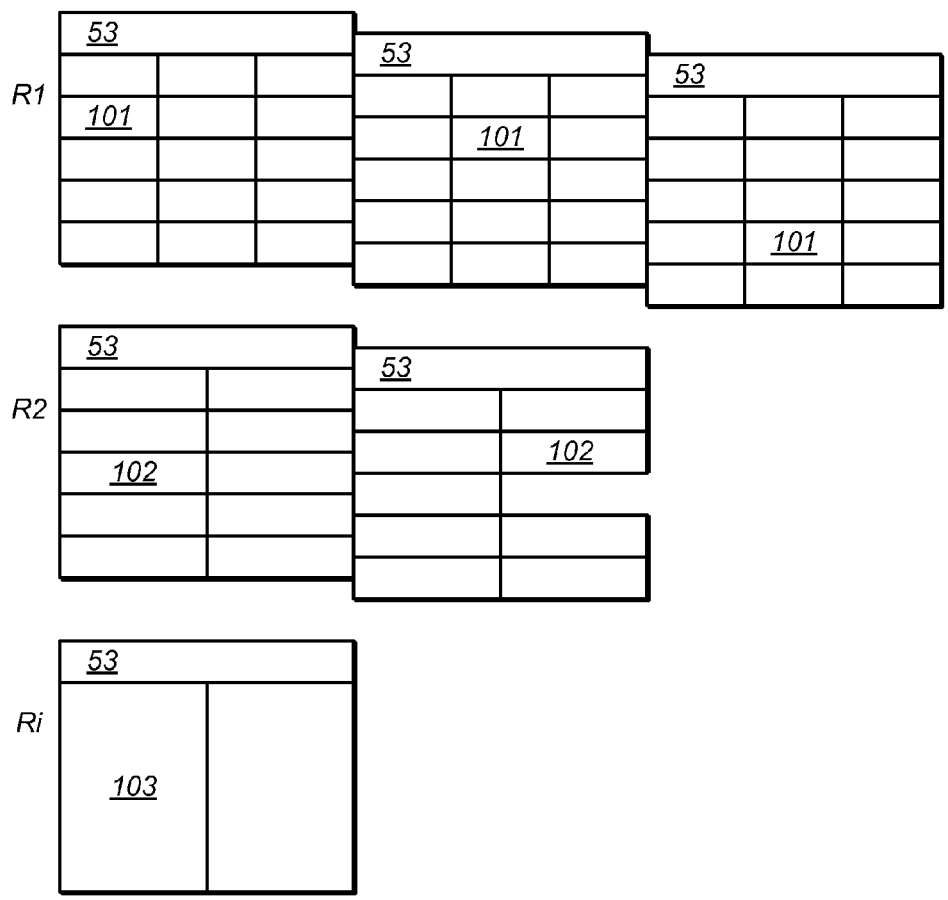
Figure 4:
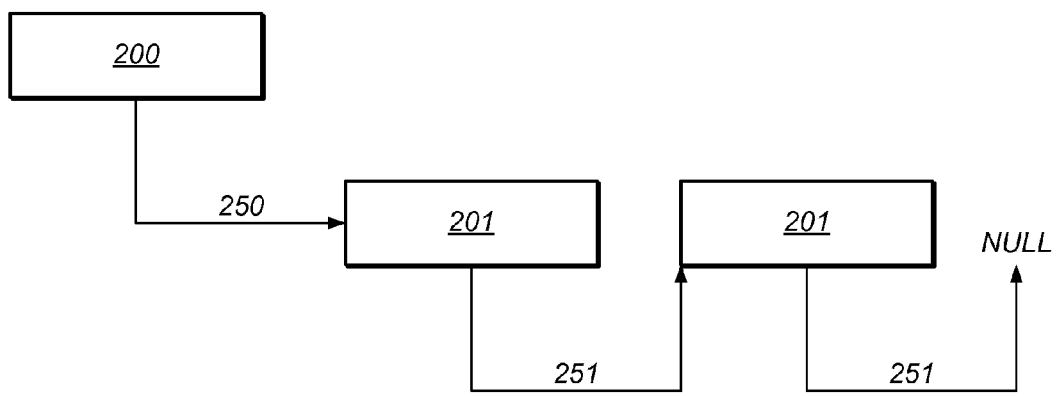

In the following detailed description presently preferred embodiments of the invention are further described with reference to the following figures:

FIG. 1: Heterogeneous network comprising a Broker according to the prior art;

FIG. 2: Details of an exemplary organization of a memory pool, according to one embodiment;

FIG. 3: Example of a memory status of the Broker during operation time, according to one embodiment;

FIG. 4: Example of a realisation of a connection of pools of one type, according to one embodiment; and FIG. 5: Details for an exemplary usage of the ticket system, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1

Various embodiments are presented of a system and method for memory allocation of a Broker. In this context, FIG. 1 presents an exemplary overview of a simplified heterogeneous network system comprising a Broker, the memory of which could be allocated using the allocation system explained below. As used herein the term "Broker" or "Broker system" refers to a combination of software and/or hardware which manages communication between a plurality of clients and a plurality of servers.

FIG. 1 schematically shows an exemplary arrangement of the Broker 20 in a network comprising a plurality of clients 10*a*-10*d* and a plurality of servers 12*a*-12*d*. Details of the communication between clients, servers and the Broker are disclosed in EP 0 600 235 B1 as well as numerous management functions of the Broker 20.

For performing its tasks, the Broker 20 may need to store information on resources of different resource types relating to the operation of the Broker, such as, for example, participants, conversations, publications, services, topics, messages, communication buffers, etc. A static memory management of the Broker as used in the prior art may not allow the user to react to specific requirements in an adequate way without terminating the operation of the Broker, reconfiguring and restarting the Broker.

For increasing the efficiency of the Broker and for avoiding reconfigurations and restarts, a method and system is needed which enables the Broker to allocate, manage and deallocate memory at runtime. In other words, the Broker should dynamically and flexibly deal with memory requirements, preferably without affecting its functionalities. Further, multithreading as well as multiprocessing may be supported in order not to restrict the portability of the system. As a result, the Broker can be used in combination with different underlying operating systems and/or software and/or hardware.

This objective may be achieved by managing the resources in separate, type-specific memory pools wherein the amount of memory available for the resources of the Broker is not limited. The only limiting factor may be the operating system itself, since the memory for the memory pools is directly requested and obtained from the operating system. Further, the method may be capable of identifying memory pools which are not used for deallocating their memory, thereby providing the Broker with flexibility and dynamic behavior. However, with respect to the compatibility to the prior art Broker system mentioned above, a static arrangement of resources can—if necessary—be maintained, since a memory pool can be used as a fixed array for blocks of fixed length.

FIG. 2

An exemplary structure of a memory pool 50 is shown in FIG. 2. The memory pool 50 can be provided in volatile or non-volatile memory of the Broker or in any other kind of memory connected to the Broker.

As shown, the memory pool 50 shown in FIG. 2 may include an administrative part 53 and a data part 54. The data part 54 may be divided into memory blocks s1, s2, . . . , sn possibly having a fixed size. Although not shown in FIG. 2, a single memory block may take up the whole data part 54. Further, the memory pool 50 may be related to one specific resource type R1, R2, . . . , Ri (not shown in FIG. 2.). In other words, the memory pool 50 may store only information for resources of a specific type. Some resources such as participants, services, etc. may include control blocks with a fixed size; other resources such as communication buffers, messages, etc. may be variable in their size.

Since the memory pools are adapted to the type-specific requirements of the related resource, the amount and size of the comprised memory blocks may vary according to the resource type. It is further possible that memory pools contain a configurable amount of a specific resource, i.e., a configurable amount of memory blocks. The memory block size may suit the memory requirements of a resource. For example, for resources with control blocks, the memory block size may comply with the size of a single control block. Accordingly, if the control block of a resource of a certain type needs to be stored, it may be stored in exactly one memory block of a memory pool specific to this resource type.

In another embodiment (not shown in FIG. 2), resources with varying length may be processed and/or stored in the memory pool. In this case, the memory pool may not be formatted in advance. If so, it is possible to set up the memory pool as a heap for data with variable length.

In one embodiment, the memory pools may store information for resources with varying length by also using a memory pool with memory blocks of a fixed size, e.g., one of the following sizes: 256 bytes, 512 bytes, 4096 bytes, or any other suitable size. The size of the memory blocks may be determined or specified according to internal size definitions. The resource may be stored in the necessary amount of contiguous memory blocks, if the necessary amount of contiguous memory blocks is available. Accordingly, memory blocks may either store control blocks of a fixed size, or user data of variable length or any other kind of data being either of a fixed size or of variable size.

The administrative part 53 of the memory pool may represent the usage of the pool's memory blocks. In one embodiment, the administrative part 53 may include a bit list, which may efficiently solve the problem of examining if sufficient memory blocks are available. At least one bit in the administrative part may correspond to at least one assigned memory block of the pool. Preferably, the first bit in the bit list may describe the status of the first slot s1 and so on. A bit value of "0" may indicate that the memory slot is empty or available for usage and a bit value of "1" may indicate that something is already stored there, as for example, shown in FIG. 2 for memory slot s3.

Note that the invention is not limited to the above described scheme. Any other approach to providing information as to which memory blocks are free and which are not is applicable. Due to this data management, the pool management may operate without any defragmentation. In particular, the resource specific usage of the pools makes defragmentation unnecessary, since the memory blocks in a memory pool are either free or occupied but never need to be defragmentated. Further, a specific data organization is achieved by using resource-specific memory pools.

In a further embodiment, more than one memory pool may exist for at least one resource type. In other words, the system may be extensible. The amount of memory pools for one resource type may depend on the requirements. If the requirements increase, further pools may be allocated. If the requirements decrease, unused pools may be freed. This may result in an exemplary memory status as shown in FIG. 3. For the different resource types R1, R2, . . . , Ri different amounts of memory pools may be allocated, formatted and used. As can be seen, the memory blocks 101, 102 and 103 for the different resources may be of different size and there may be different amounts in the memory pools for different resource types R1, R2, . . . , Ri. The shaded memory blocks may be occupied blocks, indicating that contiguous memory blocks can be occupied but also non-contiguous blocks.

In one embodiment, at least one POOL_CONTROL 200, exemplary shown in FIG. 4, may be created for at least one resource type and applied for organizing and managing the pools of this at least one resource type. The POOL_CONTROL 200 may form a kind of anchor for a specific resource type and may represent all memory pools related to this resource type. It may be situated outside the memory pools, possibly in the internal heap of the Broker. It may further include a list, preferably a double linked list of POOL_HEADER elements 201, which may be POOL_HEADER control blocks. Other lists, e.g., a single linked lists as shown in FIG. 4, or other kind of data structures are envisioned. Note that the list in FIG. 4 is exemplary and not limited to two POOL_HEADER 201. The POOL_CONTROL 200 may include a link 250, pPoolHeaderTop, to the first element of the list. Each further list element may include a link 251, header.next, to the following element. If there is no further element, the link is set to NULL. An exemplary structure for a POOL_CONTROL 200 is shown below:

```
struct_POOL_CONTROL
{
    SMP_LOCK_T   lock;           // Serialize pool control access
    HEADER*      pPoolHeaderTop; // First entry in list of allocated pools
    HEADER*      pPoolHeaderBot; // Last entry in list of allocated pools
    SMBLK*       pSemaResponse;  // Wait until ticket has been processed
    CE_BOOL      fAllocatePool;  // Pool allocation requested
    CE_BOOL      fDeallocatePool; // Pool deallocationrequested
};
```

A POOL_HEADER 201 may represent and describe one memory pool, e.g., its characteristics may depend on the pool's resource type. It may form an anchor for a resource specific memory pool. The headers 201 may also be situated outside of the memory pool, possibly in the internal heap of the Broker. They may include a link to the actual memory pool and/or a link to the pool's administrative part and/or a link to the pool's data part. There may be more than one link to the data part, e.g., to the beginning and to the end of the data part (cf. FIG. 2: pDataLow 51, pDataHigh 52). An exemplary structure for a POOL_HEADER 201 is shown below:

```
struct_POOL_HEADER
{
    HEADER    header;               // Double linked list
    CE_VOID*  pMemoryPool;          // Address of pool
    CE_BYTE*  pBitList;             // Control area bit list
    CE_BYTE*  pDataLow;             // Data area low end
    CE_BYTE*  pDataHigh;            // Data area high end
    CE_LONG   nBytes;               // Size of pool
    CE_LONG   nSlots;               // Total number of slots
    CE_LONG   nSlotsFree;           // Number of free slots
    CE_LONG   sizeSlot;             // Size of one slot
    time_t    lastActivityTime;     // Time stamp of last access
};
```

The method may begin with the initialization of the Broker. During the initialization, required memory pools may be initially allocated and possibly formatted according to configuration data and or based on internal default values. Formatting may include creating an administrative part, formatting the data part to the required data structure of memory blocks, which is not always necessary, especially not for memory blocks related to a resource type of a resource with variable length. In one embodiment, the memory block size for memory pools for such resource types may not be configurable but given by the implementation. Further, it is possible to provide a type-specific formatting within at least one memory block. During initialization, at least one memory pool may be allocated for each resource type required for the current session of the Broker. Alternatively, memory pools may be allocated for selected resource types, for all resources or for no resource and only providing an initial memory pool if memory for a first resource type is requested. The memory allocated during this initialization of memory pools represents the initial memory serving as a basis for processing.

If, at runtime, the capacity of a memory pool of a specific type is completely used, a new memory pool of the same type may be allocated. Alternatively, in particular for resources with variable length, a new memory pool may be allocated, if the requested amount of contiguous memory blocks is not available. Requests for memory allocation for pools may be resource specific.

The flexibility of the method may be realized by the implementation of a ticket system for dynamic changes of the memory configuration, e.g., for processing requests for the generation of new memory pools or for the removal of unused pools. The ticket system may be activated before the initialization of the Broker is finished and remains active during the complete Broker session.

Figure 5:
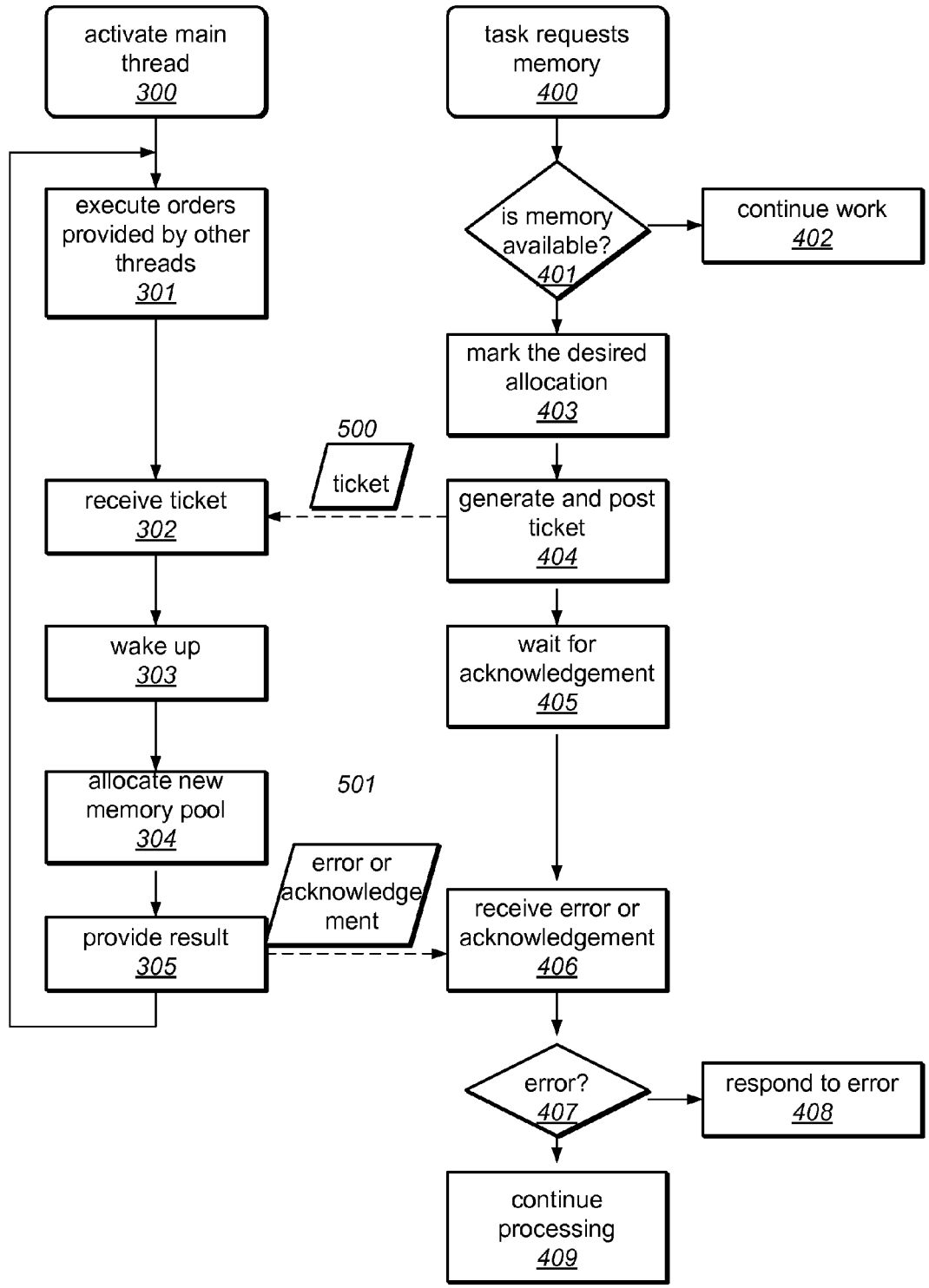

The ticket system may further assures the portability of the method and system, since all requests for allocating or freeing memory for the pools may be processed in a dedicated thread and/or task. The ticket system running in this dedicated thread and/or task may be instructed to allocate or deallocate memory by at least one other thread and/or task of the Broker. Thus, it may be ensured that the described method is applicable for multithreading as well as for multiprocessing, because in operating systems, such as e.g. z/OS (multithreading) of the company IBM, memory pieces allocated in one thread need to be freed in the same thread. Freeing the memory in a different thread is not allowed. Operating systems which do not support multithreading, such as e.g. BS2000/OSD of the company Fujitsu-Siemens, may map multithreading applications to multitasking. Memory allocated in one task can only be used and deallocated in this task. In order to make the memory of a task available to other tasks, the memory may need to be explicitly introduced to the other tasks. The basis for this requirement is provided by the ticket system, which will be described in the following with reference to FIG. 5 showing an exemplary process.

The main or dedicated thread or task 300 may be activated during the initialization of the Broker. After initialization, it may wait to execute orders provided by other threads of the Broker system (step 301). The dedicated thread or task 300 may be in a sleeping status during the waiting period. If, after the initialization, a thread or task 400 requests memory for a resource, it may be determined if the request can be satisfied by the amount of memory available in the responsible memory pool (401). If enough memory blocks are available, the thread or task 400 may continue with its work (402). Otherwise, the thread or task 400 may mark the desired allocation in step 403. In 404, it may generate and post a ticket 500 to the dedicated thread or task 300 and may wait in 405 for an acknowledgement from the dedicated thread or task 300. In the meantime, the dedicated thread or task 300 may receive the ticket 500 in 302 and may be woken up for executing the received ticket in 303.

In 304, the dedicated thread or task 300 may attempt to allocate and generate a new type-specific memory pool. It may communicate the result 501 of the execution to the ordering thread or task in step 305. The result 501 can be an acknowledgment if the execution was successful; otherwise it could be information about the occurred problem or error. Afterwards, the dedicated thread or task 300 may return to 301 for waiting for further tickets. When receiving either an acknowledgement 501 or an error message 501 from the dedicated thread or task 300 in 406, the thread or task 400 may deal with the received content according to its nature (407). If it was an acknowledgement, the thread or task 400 may check the result and continue processing as planned in 409. Otherwise, it may deal with the error information in 408.

The ticket system may be further used in a similar manner if a memory pool is not used at all. This may be the case if there is no data in the memory pool. In such a case, the memory of the pool may be freed and given back to the operating system. In one embodiment, this task may be performed by a timeout-manager supervising the status of at least one memory pool. After a defined holding time has passed, the timeout-manager may generate a ticket ordering the removal of the unused memory pool. The deallocation order of the timeout-manager may be independent from the fact, whether the memory pool was allocated during the initialization of the Broker or later during runtime. In one embodiment, the timeout-manager may be the only entity which can issue deallocation orders. In another embodiment, the threads or tasks may also perform a deallocation. When a Broker session is terminated, all memory pools may be deallocated.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A memory allocation method in a Broker system, wherein the method comprises:
    managing communication between a plurality of clients and a plurality of servers, wherein said managing is performed by the Broker system, wherein said managing comprises:
        allocating memory for a plurality of memory pools, wherein said allocating is requested by threads of the Broker system using a ticket system, the ticket system being performed by a dedicated thread for performing the steps of executing instructions provided by the other threads, receiving a ticket requesting memory allocation from the other threads, and generating or allocating a new memory pool in accordance with the request; and
        dividing each memory pool into memory blocks of a size which is specific to a type of a resource, wherein the resource is related to the communication managed by the Broker; and
        storing data regarding the communication in one or more of the memory blocks.

2. The method of claim 1, further comprising:
    allocating a further memory pool of the specific resource type if more memory for said resource type is required during operation of the Broker.

3. The method of claim 1, further comprising:
    dynamically deallocating memory of a memory pool if the pool is not used.

4. The method of claim 3, wherein said dynamically deallocating memory of the memory pool comprises a timeout-manager automatically issuing the deallocation of the memory of the memory pool if the memory pool is not used for a predetermined amount of time.

5. The method of claim 1, further comprising:
    dividing a memory pool into an administrative part and a data part.

6. The method of claim 5, wherein said dividing the memory pool comprises:
    dividing the data part of the memory pool into memory blocks of a fixed size.

7. The method according of claim 5, wherein said storing comprises:
    storing data with varying requirements for memory space in the data part.

8. A non-transitory computer-accessible memory medium comprising program instructions for managing memory allocation in a Broker system, wherein the Broker system manages the communication between a plurality of clients and a plurality of servers, wherein the program instructions are executable by a processor to:
    allocate memory for a plurality of memory pools, wherein said allocating is requested by threads of the Broker system using a ticket system, the ticket system being performed by a dedicated thread for performing the steps of executing instructions provided by the other threads, receiving a ticket requesting memory allocation from the other threads, and generating or allocating a new memory pool in accordance with the request; and
    divide each memory pool into memory blocks of a size which is specific to a type of a resource, wherein the resource is related to the communication between the plurality of clients and the plurality of servers managed by the Broker; and
    store data regarding the communication in one or more of the memory blocks.

9. The memory medium of claim 8, wherein the program instructions are further executable to:
    allocate a further memory pool of the specific resource type if more memory for said resource type is required during operation of the Broker.

10. The memory medium of claim 8, wherein the program instructions are further executable to:
    dynamically deallocate memory of a memory pool if the pool is not used.

11. The memory medium of claim 10, wherein said dynamically deallocating memory of the memory pool comprises a timeout-manager automatically issuing the deallocation of the memory of the memory pool if the memory pool is not used for a predetermined amount of time.

12. The memory medium of claim 8, wherein the program instructions are further executable to:
    divide a memory pool into an administrative part and a data part.

13. The memory medium of claim 12, wherein said dividing the memory pool comprises:
    dividing the data part of the memory pool into memory blocks of a fixed size.

14. The memory medium according of claim 12, wherein said storing comprises:
    storing data with varying requirements for memory space in the data part.

15. A Broker system for managing communications, the Broker system comprising:
    a network port for coupling a network, wherein the network port is operable to communicate with a plurality of clients and a plurality of servers;
    a processor; and
    a memory medium coupled to the processor, wherein the memory medium comprises:
        program instructions executable to manage communication between the plurality of clients and the plurality of servers, wherein the program instructions are executable to allocate a plurality of memory pools, wherein each memory pool comprises memory blocks of a size which is specific to a type of a resource, the resource being related to the communication being managed;
        wherein allocation of the memory pools reduces fragmentation of the memory medium, and wherein said allocating is requested by threads of the Broker system using a ticket system, the ticket system being performed by a dedicated thread for performing the steps of executing instructions provided by the other threads, receiving a ticket requesting memory allocation from the other threads, and generating or allocating a new memory pool in accordance with the request.

* * * * *